United States Patent [19]

Sakata

[11] Patent Number: 4,531,653
[45] Date of Patent: Jul. 30, 1985

[54] VENTILATION DEVICE FOR FUEL TANKS

[75] Inventor: Yoshiyasu Sakata, Saitama, Japan

[73] Assignee: Honda Giken Kogyo Kabushiki Kaisha, Tokyo, Japan

[21] Appl. No.: 648,804

[22] Filed: Sep. 7, 1984

[30] Foreign Application Priority Data

Sep. 12, 1983 [JP] Japan .................................. 58-167949

[51] Int. Cl.³ ...................... B65D 25/00; B65D 90/34; F16K 24/04
[52] U.S. Cl. ..................................... 220/85 S; 137/38; 137/587; 220/85 VR; 220/85 VS; 220/86 R
[58] Field of Search ............ 220/85 VR, 85 VS, 85 S, 220/86 R; 137/38, 587

[56] References Cited

U.S. PATENT DOCUMENTS

| 2,874,712 | 2/1959 | Eshbaugh | 220/86 R X |
| 3,804,291 | 4/1974 | Fricker | 220/86 R X |
| 4,166,550 | 9/1979 | Kleinschmit et al. | 220/86 R X |
| 4,423,746 | 1/1984 | Scheuvenbrand et al. | 220/86 R X |

Primary Examiner—Allan N. Shoap
Attorney, Agent, or Firm—Irving M. Weiner; Pamela S. Burt

[57] ABSTRACT

A ventilation device on a top wall of a fuel tank mounted on a motor vehicle includes an upper panel fixedly mounted on an inner surface of the top wall of the fuel tank and extending substantially horizontally, the upper panel having an opening vented to atmosphere. A middle panel is fixedly mounted on a lower surface of the upper panel, and a lower panel is fixedly mounted on a lower surface of the middle panel and has first and second openings communicating with an interior of the fuel tank. The lower and middle panels jointly define first and second passages, and the upper and middle panels jointly define a chamber. The first and second openings communicate with the first and second passages, respectively, and the middle panel has first and second through holes providing communication between the first and second passages and the chamber, the opening in the upper panel communicating with the chamber. The ventilation device is capable of effectively ventilating air and preventing fuel from leaking.

9 Claims, 4 Drawing Figures

VENTILATION DEVICE FOR FUEL TANKS

BACKGROUND OF THE INVENTION

1. Field of the Invention

The present invention relates to a ventilation device for use with a fuel tank mounted on a motor vehicle.

2. Description of the Prior Art

Fuel tanks mounted on motor vehicles have an air vent pipe attached to a top wall thereof for discharging air upon a pressure buildup in the tank due to an increase in the air temperature. To prevent fuel from leaking through the air vent pipe when the fuel tank is tilted while allowing air to vent off, there has been proposed a fuel tank ventilator in Japanese Laid-Open Patent Publication No. 51-77716 based on West German Patent Application No. P 24 56 726.8.

The aforesaid proposed ventilation device comprises a box extending transversely of the motor vehicle and depending downwardly from a top wall of the fuel tank, the box communicating with an air vent pipe. The box includes transverse side walls joined respectively to elongated inner ventilation pipes extending along the lower surface of the box and projecting laterally with their distal ends directed in opposite directions. Although the proposed ventilation device is well capable of air ventilation and preventing fuel leakage, it requires supports for supporting the two elongated inner ventilation pipes in lateral directions within the fuel tank. The number of parts employed is therefore increased, and the procedure for connecting the parts is complex to perform.

SUMMARY OF THE INVENTION

With the foregoing prior difficulties in view, it is an object of the present invention to provide a ventilation device for fuel tanks which is capable of effectively ventilating air and preventing fuel leakage and is of a simple construction with no inner ventilation pipes and hence no supports therefor.

According to the present invention, there is provided a ventilation device on a top wall of a fuel tank mounted on a motor vehicle. The device includes an upper panel fixedly mounted on an inner surface of the top wall of the fuel tank and extending substantially horizontally, the upper panel having an opening vented to atmosphere, and a middle panel fixedly mounted on a lower surface of the upper panel. A lower panel is fixedly mounted on a lower surface of the middle panel and has first and second openings communicating with an interior of the fuel tank, the lower and middle panels jointly defining first and second passages. The upper and middle panels jointly define a chamber. The first and second openings communicate with the first and second passages, respectively, and the middle panel has first and second through holes providing communication between the first and second passages and the chamber, the opening in the upper panel communicating with the chamber.

The above and other objects, features and advantages of the present invention will become more apparent from the following detailed description when taken in conjunction with the accompanying drawings in which a preferred embodiment of the present invention is shown by way of illustrative example.

DETAILED DESCRIPTION OF THE PREFERRED EMBODIMENT

Figure 1:
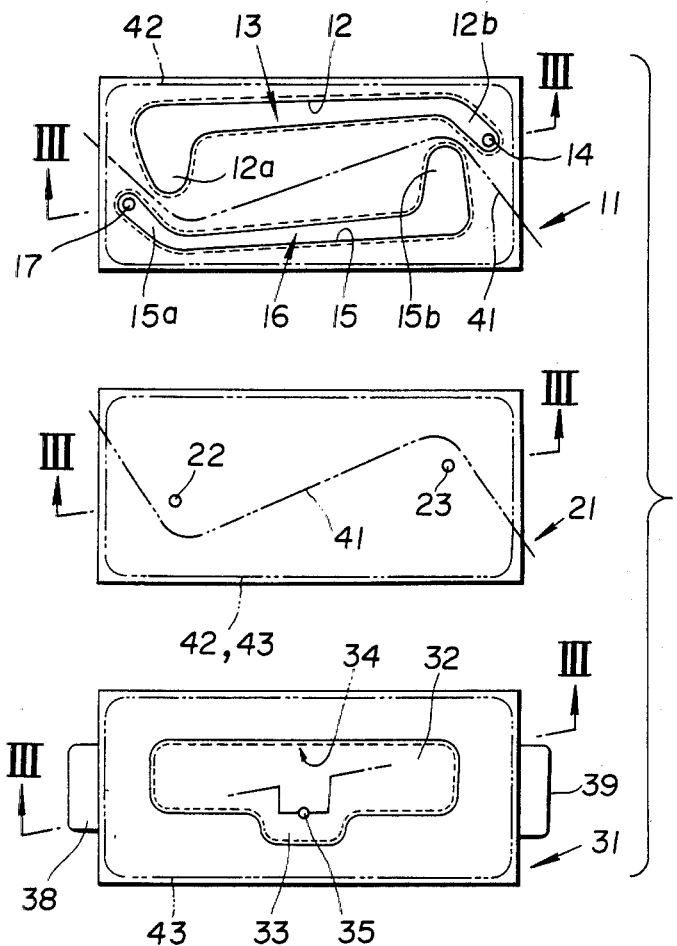
FIG. 1 is an exploded plan view of three panels constituting a ventilation device according to the present invention.

FIG. 1 illustrates a lower panel 11, a middle panel 21, and an upper panel 31 which jointly constitute a ventilation device according to the present invention, for use in a fuel tank.

The three panels 11, 21, 31 are made of metal and have rectangular configurations elongated in a transverse direction of a motor vehicle on which the fuel tank is mounted. The lower panel 11 has first and second recesses 12, 15 extending longitudinally thereof or transversely of the motor vehicle and spaced from each other transversely of the lower panel 11 in a vertical direction (FIG. 1). The first and second recesses 12, 15 are of symmetrical shapes with longitudinal ends 12a, 12b and 15a, 15b extending toward transversely intermediate portions of the panels 12, 15. The righthand end 12b of the first recess 12 is positioned rightward of the righthand end 15b of the second recess 15, and the lefthand end 15a of the second recess 15 is positioned leftward of the lefthand end 12a of the first recess 12. The righthand end 12b of the first recess 12 and the lefthand end 15a of the second recess 15 in the lower panel 11 have openings 14, 17 defined in the bottoms of the recesses 12, 15.

The middle panel 21 is in the form of a flat plate and has through holes 22, 23 defined at longitudinally spaced locations and opening above the lefthand end 12a of the first recess 12 and the righthand end 15b of the second recess 15, respectively.

The upper panel 31 has a longitudinally elongated, substantially rectangular raised portion 32 disposed in a longitudinally intermediate position and displaced upwardly, with the through holes 22, 23 in the middle panel 21 opening into the raised portion 32. The raised portion 32 thus defines a recess 36 in the lower surface of the upper panel 31. The raised portion 32 includes a smaller raised portion 33 projecting transversely in a forward direction in a longitudinally central position, there being an opening 35 defined in a top wall of the smaller raised portion 33.

Figure 4:
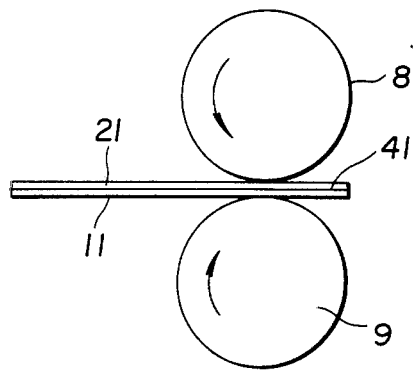
FIG. 4 is a side elevational view showing the manner in which panels are seam-welded.

For assembling the panels 11, 21, 31, the middle panel 21 is placed on the lower panel 11. To sealingly separate the recesses 12, 15 from each other, the panels 11, 21 are fed along between a positive electrode roller 8 and a negative electrode roller 9, shown in FIG. 4, and then seam-welded by the rollers 8, 9 along a line 41 between the recesses 12, 15, thereby joining the panels 11, 21. With the middle and lower panels 21, 11 thus superposed and joined, the lower surface of the middle panel 21 and the first and second recesses 12, 15 in the lower panel 11 jointly define first and second passages 13, 16.

Figure 2:
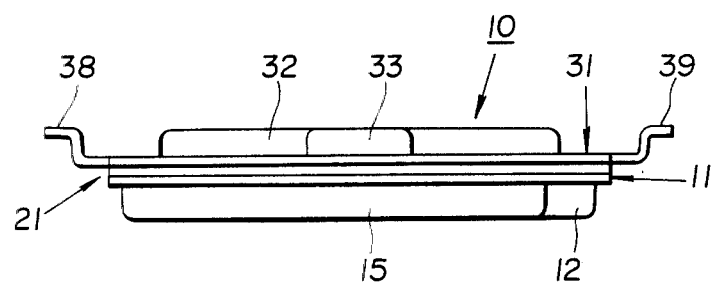
FIG. 2 is a front elevational view of the ventilation device of the invention.

Then, the upper panel 31 is placed on the middle panel 21. To sealingly separate the recesses 12, 15 and the raised portions 32, 33 from the exterior, peripheral edges of the panels 11, 21, 31 are seam-welded along lines 42, 43 to join the panels 11, 21, 31 together, thereby producing a ventilation device 10 of the present invention as shown in FIG. 2.

Figure 3:
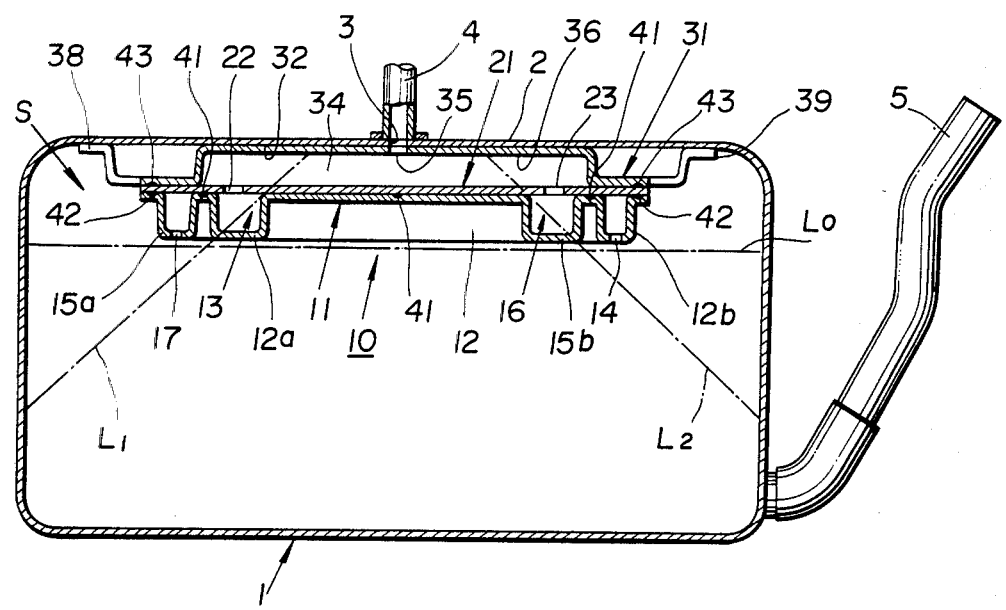
FIG. 3 is a cross-sectional view of the ventilation device as mounted in a fuel tank, the three panels being shown in a cross section taken along lines III—III of FIG. 1.

Stays 38, 39 are fixed to longitudinal ends of the ventilation device 10. As illustrated in FIG. 3, upper surfaces of the stays 38, 39 are held against the lower surface of a top wall 2 of a fuel tank 1 with the ventilation device 10 extending laterally in the fuel tank 1, and the stays 38, 39 are spot-welded to the top wall 2 of the fuel tank 1. The ventilation device 10 is thus fixed to the fuel tank 1 and depending therein from the top wall 2 of the fuel tank 1. The stays 38, 39 may be integrally formed with the upper panel 31 as shown, or with the middle panel 21 or the lower panel 11.

The ventilation device 10 is shown in a cross section taken along lines III—III of FIG. 1 for illustration purposes.

The top wall 2 of the fuel tank 1 has an opening 3 defined therein in registry with the opening 35 in the smaller raised portion 33. The opening 3 is connected to an external communication pipe 4 which is vented to atmosphere through a pressure valve (not shown) and a canister (not shown) filled with active carbon for allowing air to vent off and adsorbing vaporized fuel.

Operation of the ventilation device 10 will hereinafter be described.

Where fuel supplied through a filler neck 5 is filled substantially fully to a level $L_0$ in the fuel tank 1, air flows through the first and second openings 14, 17 in the lower panel 11 which open into a space S below the top wall 2 of the fuel tank 1, the first and second passages 13, 16 defined between the middle panel 21 and the first and second recesses 12, 15 in the lower panel 11, and the first and second communication holes 22, 23 in the middle panel 21, into a chamber 34 defined by the middle panel 21 and the recess 36 in the upper panel 31, from which air is discharged through the opening 35 into the external communication pipe 4.

When the fuel tank 1 is tilted to the right in FIG. 3 with the contained fuel having an inclined level $L_1$, the righthand opening 14 is immersed in the fuel, but the lefthand opening 17 is positioned above the inclined fuel level $L_1$. Since the lefthand opening 22 in the middle panel 21 which communicates with the immersed opening 14 through the first passage 13 is also positioned above the fuel level $L_1$, no fuel flows through the opening 22 into the chamber 34. On the other hand, air can reliably be discharged through a labyrinth composed of the lefthand opening 17 in the lower panel 11, the second passage 16, the righthand opening 23 in the middle panel 21, the chamber 34, and the opening 35 in the upper panel 31. When the fuel tank 1 is tilted in an opposite direction until the fuel level becomes inclined at level $L_2$, the ventilation device 10 operates in the same way as described above, but this time fuel is prevented from flowing through the opening 23 into the chamber 34 and air vents off through a labyrinth composed of the righthand opening 14, the first passage 13, the lefthand opening 22, the chamber 34, and the opening 35.

Therefore, when the fuel tank 1 is tilted in either direction through a large angle, fuel is reliably prevented from leaking out of the external communication pipe 4, while air can be effectively discharged from the fuel tank 1.

Good air ventilation capability can be achieved by the openings 14, 17 and the communication holes 22, 23 aligned in a vertical plane.

The passages 13, 16 defined between the lower panel 11 and the middle panel 21 are hermetically sealed from the exterior by the seam-welded line 42, and also hermetically sealed from each other by the seam-welded line 41. Furthermore, the chamber 34 defined between the middle panel 21 and the upper panel 31 is hermetically sealed by the seam-welded line 43. Therefore, any fuel is reliably prevented from seeping between the panels 11, 21, 31 into the passages 13, 16 and the chamber 34.

While in the illustrated embodiment the ventilation device 10 extends transversely of the motor vehicle, the ventilation device 10 may extend longitudinally of the motor vehicle.

Although in the illustrated embodiment the passages 13, 16 are defined by the recesses 12, 15 in the lower panel 11 and the middle panel 21, the passages may be defined by the recesses 12, 15 in the lower panel 11 and corresponding recesses defined in the middle panel 21.

With the arrangement of the present invention, the ventilation device can be well capable of effective air ventilation and preventing fuel from leaking through the ventilation device. Since the ventilation device is composed of three superposed panels defining labyrinths, it is not necessary to have any inner ventilation pipes placed in the fuel tank and hence any supports therefor. Accordingly, the ventilation device is constructed of a reduced number of parts and is compact in structure.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A ventilation device on a top wall of a fuel tank mounted on a motor vehicle, comprising:
    (a) an upper panel fixedly mounted on an inner surface of said top wall of said fuel tank and extending substantially horizontally, said upper panel having an opening vented to atmosphere;
    (b) a middle panel fixedly mounted on a lower surface of said upper panel;
    (c) a lower panel fixedly mounted on a lower surface of said middle panel and having first and second openings communicating with an interior of said fuel tank;
    (d) said lower and middle panels jointly defining first and second passages;
    (e) said upper and middle panels jointly defining a chamber;
    (f) said first and second openings communicating with said first and second passages, respectively;
    (g) said middle panel having first and second through holes providing communication between said first and second passages and said chamber; and
    (h) said opening in said upper panel communicating with said chamber.

2. A ventilation device according to claim 1, wherein said lower panel has recesses, said first and second passages being defined by said recesses and said middle panel.

3. A ventilation device according to claim 1, wherein said upper panel has a raised portion defining a recess, said chamber being defined by said recess and said middle panel.

4. A ventilation device according to claim 1, wherein said first and second openings in said lower panel are defined at ends of said first and second passages.

5. A ventilation device according to claim 1, wherein said first and second passages extend transversely of said motor vehicle and are disposed in confronting relation.

6. A ventilation device according to claim 1, wherein said first and second passages extend longitudinally of said motor vehilce and are disposed in confronting relation.

7. A ventilation device according to claim 1, wherein said upper, middle, and lower panels are joined together by seam welding.

8. A ventilation device according to claim 1, including stay means integrally formed with one of said upper, middle, and lower panels, said ventilation device being secured by said stay means to said fuel tank.

9. A ventilation device according to claim 1, wherein said first and second openings and said first and second through holes are aligned in a vertical plane.

* * * * *